US012765980B1

(12) United States Patent
Colon

(10) Patent No.: US 12,765,980 B1
(45) Date of Patent: Oct. 20, 2026

(54) CREDIT-CARD-SIZED INTERDENTAL TOOTHPICK CARD TO CARRY IN A WALLET

(71) Applicant: Ryan Colon, Rockwall, TX (US)

(72) Inventor: Ryan Colon, Rockwall, TX (US)

( * ) Notice: Subject to any disclaimer, the term of this patent is extended or adjusted under 35 U.S.C. 154(b) by 105 days.

(21) Appl. No.: 18/630,806

(22) Filed: Apr. 9, 2024

(51) Int. Cl.
*A61C 15/02* (2006.01)

(52) U.S. Cl.
CPC .................................... *A61C 15/02* (2013.01)

(58) Field of Classification Search
CPC ...................................................... A61C 15/02
See application file for complete search history.

(56) References Cited

U.S. PATENT DOCUMENTS 1,462,062 A * 7/1923 Browning .............. A61C 15/02 132/329
2,035,425 A * 3/1936 Doll ....................... A61C 15/02 206/104
2,477,194 A * 7/1949 Millard .................. A61C 15/02 206/380
2,760,628 A * 8/1956 Briggs ................... B65D 71/00 206/104
2,762,501 A * 9/1956 Cameron ............... A61C 15/02 206/104
3,331,499 A * 7/1967 Jost ....................... A61M 5/002 206/367
3,438,486 A * 4/1969 Pinkas ................... B65D 83/00 206/820
4,312,370 A * 1/1982 Hinge .................... A61C 15/02 206/380
4,328,892 A * 5/1982 Heitlinger ............. A46B 17/04 206/229
4,832,194 A * 5/1989 Cheng .................... B65D 85/24 206/443
D307,493 S * 4/1990 Cheng ............................ D28/66
(Continued)

FOREIGN PATENT DOCUMENTS

CA 2238343 A1 * 5/1997 ............. B65D 83/02
CN 109984856 A * 7/2019 ............. A61C 15/02
(Continued)

OTHER PUBLICATIONS

Espacenet Korean to English translation of Heo KR-20130004521-U. Translated May 21, 2026. (Year: 2013).*
(Continued)

*Primary Examiner* — Anne M Kozak

(57) ABSTRACT

An interdental toothpick card includes a molded, credit-card-sized body having multiple thickness regions including a recessed interior region. A plurality of interdental toothpicks are integrally formed within the recessed region, each toothpick including a grip portion and a cleaning portion. Opposing controlled-fracture retention tabs join each toothpick to the card body and permit selective separation of individual toothpicks when bent with sufficient force. The cleaning portion of each toothpick is positioned within a cavity so that its tip remains below the exterior surface plane of the card. A perimeter frame surrounds the recessed region to maintain the rigidity and geometry of the card. The structure provides a compact, molded arrangement for retaining and accessing interdental toothpicks.

1 Claim, 2 Drawing Sheets

(56) References Cited

U.S. PATENT DOCUMENTS

| | | | | | |
|---|---|---|---|---|---|
| 5,119,941 | A * | 6/1992 | Lepie | A24F 27/12 132/76.5 |
| 5,181,755 | A * | 1/1993 | Stanwich | A61C 3/00 294/212 |
| D365,422 | S * | 12/1995 | Hallam | D28/65 |
| 5,560,379 | A * | 10/1996 | Pieczenik | A61C 15/02 132/329 |
| 5,855,215 | A * | 1/1999 | Clarke | A61C 15/02 132/321 |
| 6,044,848 | A * | 4/2000 | Huang | B65D 75/14 206/113 |
| 6,213,132 | B1 * | 4/2001 | Andrews | A61C 15/02 206/102 |
| D548,886 | S * | 8/2007 | Lee | D28/65 |
| D610,747 | S * | 2/2010 | Brownell | D28/65 |
| D643,254 | S * | 8/2011 | Maudsley | D9/756 |
| 8,181,786 | B1 * | 5/2012 | Alas | A61C 15/00 206/570 |
| D670,434 | S * | 11/2012 | Warner | D28/65 |
| D802,218 | S * | 11/2017 | Sugawara | D28/65 |
| D838,910 | S * | 1/2019 | Martone | D28/65 |
| D846,806 | S * | 4/2019 | Martone | D28/65 |
| 11,930,946 | B1 * | 3/2024 | Grossman | A47G 21/12 |
| 2018/0035798 | A1 * | 2/2018 | Friedt | A46B 15/0093 |
| 2018/0168783 | A1 * | 6/2018 | Kato | B29C 45/14065 |

FOREIGN PATENT DOCUMENTS

| | | | | |
|---|---|---|---|---|
| FR | 2784286 A1 * | 4/2000 | A61C 15/02 |
| KR | 200394932 Y1 * | 9/2005 | G09F 23/00 |
| KR | 20130004521 U * | 7/2013 | G09F 23/06 |

OTHER PUBLICATIONS

Clarivate Analytics English Description of Heo KR-20130004521-U. Accessed May 22, 2026. (Year: 2013).*

* cited by examiner

CREDIT-CARD-SIZED INTERDENTAL TOOTHPICK CARD TO CARRY IN A WALLET

CROSS-REFERENCE TO RELATED APPLICATIONS

US00D643254S, US00D777042S

BACKGROUND OF THE INVENTION

Certain known interdental toothpick products are formed from flat sheets of material bearing stamped or scored cut lines that define thin triangular or curved strips removable by bending or punching. Devices of this type generally rely on a uniform-thickness sheet construction and flat, two-dimensional geometries. As a result, such configurations typically do not provide molded ergonomic toothpick shapes, recessed cavities for tip protection, controlled-fracture retention structures, or card bodies incorporating multiple thickness regions for improved strength and safety.

The present invention provides a structurally different, safer, more ergonomic, and more durable toothpick card formed by molding—not stamping or cutting—resulting in a multi-thickness architecture with recessed cavities, controlled-fracture retention tabs, molded 3D toothpick geometries, and perimeter safety frames.

SUMMARY OF THE INVENTION

The present invention provides a credit-card-sized interdental toothpick card formed with a first (thicker) structural region and a second (thinner) integrated-toothpick region. A plurality of interdental toothpicks are integrally molded within the second region, each toothpick having a textured or thickened grip portion and a curved or tapered cleaning portion. Each toothpick is retained within the card by two or more controlled-fracture retention tabs, each positioned at opposite ends of the toothpick. These tabs maintain card integrity during normal handling but allow intentional detachment via a predictable bending force. The invention further provides recessed cavities or pockets formed into the card body to receive the pointed cleaning ends of the toothpicks such that the tips remain below the perimeter plane of the card, thereby preventing accidental contact, snagging, or contamination.

BRIEF DESCRIPTION OF DRAWINGS

These and other features and advantages of the various embodiments disclosed herein will be better understood with respect to the following description and drawings, in which like numbers refer to like parts throughout, and in which.

DETAILED DESCRIPTION OF THE INVENTION

Figure 1:
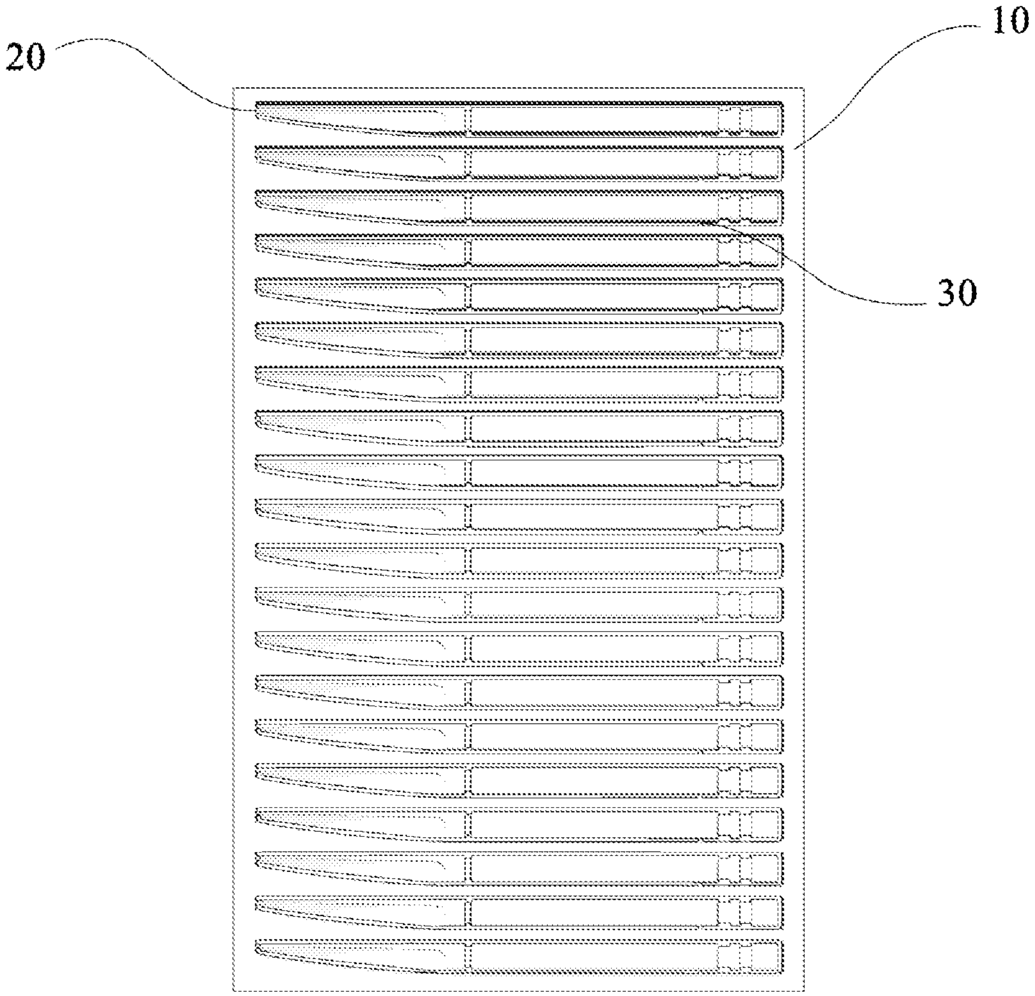
FIG. 1 is a front view showing multiple interdental toothpicks integrally molded within a recessed second thickness region of a credit-card-sized interdental toothpick card structure 10. The end of the interdental toothpick that tapers into a pointed tip, commonly used for interdental cleaning, is positioned within a recessed cavity and connected [with perforated tabs] by controlled-fracture retention tabs that hold the interdental toothpicks in place relative to the card structure 20. The opposite end of each interdental toothpick includes a textured or thickened grip portion, and controlled-fracture retention tabs [perforated tabs] connect this end of the interdental toothpick to the card structure as well 30. The card further includes a perimeter protection frame defining the recessed region.
Figure 2:
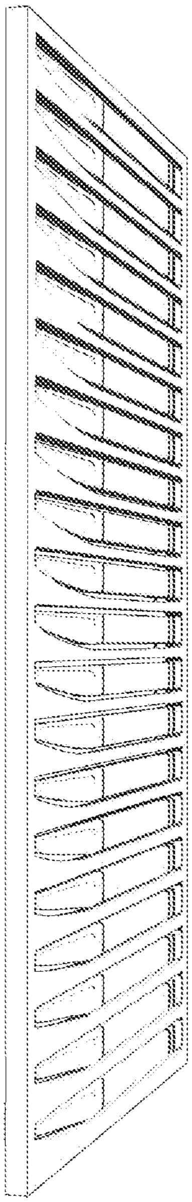
FIG. 2 is an isometric view illustrating the multi-thickness card body, recessed cavities, and controlled-fracture retention tabs at opposite ends of each molded toothpick.
Figure 3:
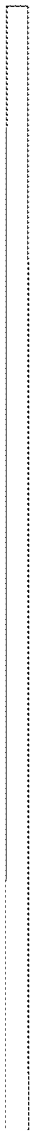
FIG. 3 is a side view showing the first thickness region, the thinner recessed toothpick region, and the relative depth of the recessed cavities below the perimeter plane of the card.

The interdental toothpick card is formed as a credit-card-sized body having a generally planar outer perimeter and a thickness comparable to that of commonly carried cards. The card body includes at least a first thickness region defining a perimeter frame and a second, thinner recessed region positioned inward of the perimeter frame. The recessed region houses a plurality of interdental toothpicks that are integrally molded with the card body as a single structure.

Each interdental toothpick includes a grip portion and a cleaning portion. The grip portion may have a thickened, textured, contoured, or otherwise ergonomically shaped surface configured to be held between the fingers of a user. The cleaning portion extends from the grip portion and tapers or curves to a pointed tip suitable for insertion between teeth. Because the toothpicks are molded as three-dimensional components rather than cut from a flat sheet, the grip and cleaning portions may include contours, tapers, ribs, fillets, or other non-planar shaping that improves usability and comfort.

The pointed tip of each toothpick resides within a recessed cavity formed in the second thickness region. Each cavity is dimensioned to receive and protect the tip so that the cleaning portion does not extend above the perimeter plane of the card. This recessed configuration reduces the likelihood of snagging or accidental engagement during normal handling and storage. The perimeter frame surrounding the recessed region provides reinforcement against bending, pressure, and friction applied to the exterior of the card.

Each interdental toothpick is connected to the card body by two or more controlled-fracture retention tabs located at opposite ends of the toothpick. The retention tabs are molded as reduced-thickness brides extending between the toothpick and the surrounding recessed portion of the card. The tabs are configured to withstand normal handling forces but to fracture predictably when a user intentionally bends or twists the toothpick along a predetermined direction. This connection method differs from scored or perforated sheet-based structures and enables the molded toothpick to be removed as a fully formed three-dimensional component.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

The invention claimed is:

1. A credit-card-sized interdental toothpick card comprising:

a rectangular card body having an upper side opposite a lower side, wherein the upper side and lower side are connected by a first side and a second side, the second side opposite the first side;

a plurality of aligned interdental toothpicks integrally molded with the card body, the plurality of aligned interdental toothpicks comprising the majority of the toothpick card;

wherein each toothpick of the plurality of aligned interdental toothpicks has a top side opposite a bottom side, wherein the top side and bottom side are connected by a first side portion and a second side portion, the second side portion opposite the first side portion;

wherein each toothpick further comprises a grip portion including a ribbed surface on the first side portion and second side portion;

wherein each portion of the card body surrounding each toothpick has a corresponding top side, a corresponding bottom side, a corresponding first side portion, and a corresponding second side portion;

wherein each toothpick of the plurality of aligned interdental toothpicks is arranged such that each corresponding top side of each portion of the card body surrounding each toothpick is parallel with the upper side of the rectangular card body, each corresponding bottom side of each portion of the card body surrounding each toothpick is parallel with the lower side of the rectangular card body, each corresponding first side portion of each portion of the card body surrounding each toothpick is parallel with the first side of the rectangular card body, a majority length of each corresponding second side portion of each portion of the card body surrounding each toothpick is parallel with the second side of the rectangular card body, and a remaining length of each corresponding second side portion of each portion of the card body surrounding each toothpick tapers toward the corresponding bottom side of each portion of the card body surrounding each toothpick to form a cleaning portion along the second side portion of each toothpick;

wherein the cleaning portion along the second side portion of each toothpick is a first cleaning portion, and an adjacent cleaning portion along the first side portion of the toothpick is a second cleaning portion;

wherein the first and second cleaning portions of each toothpick are recessed with respect to the corresponding first side portion and the corresponding second side portion of each portion of the card body surrounding each toothpick such that the first and second cleaning portions of each toothpick are located within a cavity formed into a thickness of the card body;

wherein each toothpick is spaced such that each portion of the card body surrounding each toothpick remains intact once each toothpick is removed, thus maintaining structural integrity of the toothpick card;

wherein each toothpick is connected to the card body by two or more tabs located at the top side and the bottom side of each toothpick; and wherein the tabs are configured to resist unintentional detachment during normal storage or handling of the toothpick card, thus allowing intentional removal of each toothpick only when subjected to a predetermined bending force sufficient to fracture the tabs.

* * * * *